A. C. STIPPICH.
MACHINE FOR SHARPENING LAWN MOWERS.
APPLICATION FILED APR. 29, 1921.
1,406,298. Patented Feb. 14, 1922.
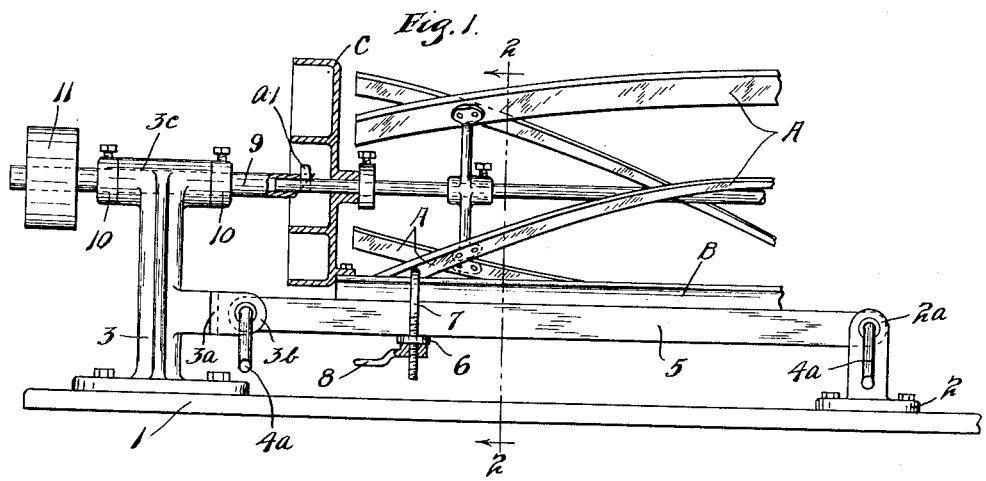
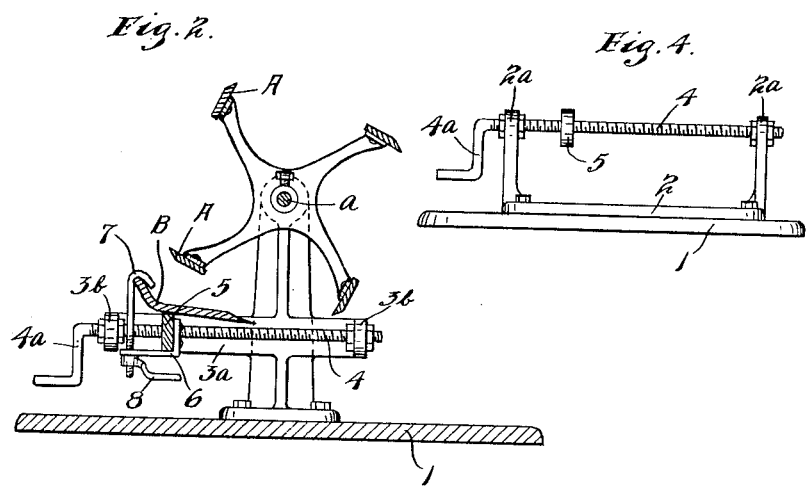
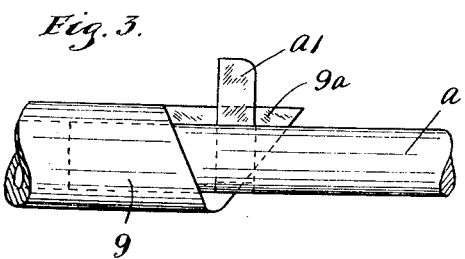
INVENTOR.
ARNO C. STIPPICH.
By His ATTORNEY.
James F. Williamson

UNITED STATES PATENT OFFICE.

ARNO C. STIPPICH, OF HAYFIELD, MINNESOTA.

MACHINE FOR SHARPENING LAWN MOWERS.

1,406,298.  Specification of Letters Patent.  Patented Feb. 14, 1922.

Application filed April 29, 1921. Serial No. 465,373.

*To all whom it may concern:*

Be it known that I, ARNO C. STIPPICH, a citizen of the United States, residing at Hayfield, in the county of Dodge and State of Minnesota, have invented certain new and useful Improvements in Machines for Sharpening Lawn Mowers; and I do hereby declare the following to be a full, clear, and exact description of the invention, such as will enable others skilled in the art to which it appertains to make and use the same.

This invention relates to a device for sharpening lawn mowers. It is well known to users of such machines that the same often become dull and the cutter head gets out of the right relation to the cutter bar. When the cutters and cutter bar are assembled in the mower for operation it is difficult to satisfactorily adjust and sharpen the same, even though the blades are supposed to be self-sharpening.

It is an object of this invention therefore to provide a device in which the cutters and cutter bar can be supported in correct relation and the cutters readily turned to sharpen the same and to have the edges thereof in correct relation to the cutter bar.

It is a further object of the invention to provide such a device with various adjustments and with means for applying power thereto.

These and other objects and advantages of the invention will be apparent from the following description made in connection with the accompanying drawings in which like reference characters refer to the same parts throughout the different views and in which—

Fig. 1 is a view in side elevation of the device;

Fig. 2 is a section on the line 2—2 of Fig. 1, looking in the direction of the arrows;

Fig. 3 is a detail thereof on an enlarged scale; and

Fig. 4 is an end view of one of the supporting brackets.

Referring to the drawings, the device comprises a base plate or support 1 to which are secured spaced brackets 2 and 3 The bracket 3 has, at a short distance from its face portion an extending arm, from each side of which, at a short distance from the bracket, extends an arm $3^a$ having bearing portions $3^b$ projecting outward at right angles thereto at each end.

The bracket 2 comprises upstanding spaced arms $2^a$ which are bored to form bearings near their upper ends. In the arms $2^a$ and in the bearing portions $3^b$ are journaled screw members 4 having their ends projecting at one side of the brackets and provided with crank portions $4^a$. Bar 5 extends between the screws 4 and is formed with threaded bores to engage the same to form nuts by means of which the bar can be traversed on the screws when the same are turned by the gears $4^b$. One or more angle members 6 have their vertical portions bolted or otherwise secured to the bar 5 and have their horizontal portion projecting from the underside thereof, which portions are apertured to receive the vertically extended shanks of the hook members 7. These members 7 are formed with a hook portion at one end and the straight shanks thereof are threaded to receive a handled nut 8 applied to the same below the members 6. The bracket 3 extends some distance above the bar 5 and is provided with a bearing portion $3^c$ in which is journaled a sleeve member 9, which is held from longitudinal movement in said bar by collars 10 located at each side of the bearing and secured to the sleeve by suitable set screws. The said sleeve projects outwardly from the bearing a short distance and is provided with a belt pulley 11. The said sleeve also projects inwardly some distance from the bearing and has its end portion cut on a helix having a straight longitudinal shoulder $9^a$ at one portion thereof.

In using the device, the cutter head A, cutter bar B and connecting casting C of the lawn mower are placed in the device, the central shaft $a$ of the cutter head A being inserted in the inner end of the sleeve 9. This shaft is usually provided with an extension or key $a^1$ which is placed in position to be contracted by the shoulder portion $9^a$. The parts of the lawn mower described and shown can be easily removed from the other parts of the mower by merely removing one of the side wheels, the cutter head and bar usually being connected by a casting C, as shown. The cutter bar B is supported upon the bar 5 of the device and this bar will be adjusted to suitable position on the screws 4 to hold the said cutter bar in convenient and desired position. The said cutter bar will also be clamped into firm contact and held in position on the bar 5 by engaging the hooks 7 with the same and then drawing the said hooks down tightly by means of the handled nuts 8.

With the parts of the lawn mower so assembled, power is applied to the pulley 11 by a suitable belt. Emery dust and oil or similar material is placed on the edge of the cutting bar B and the cutter head A then revolved to bring the cutters into contact with the edge of said cutter bar, thus sharpening both the bar and the cutters and forming thereon the proper cutting edges. When the cutter is sufficiently sharpened, the shaft $a$ can be readily disengaged from the sleeve 9 by reverse movement of the sleeve. The helical curve on the end of the sleeve will contact with the key $a^1$ to move the shaft out of the sleeve. The handled nut 8 being released, the parts can be quickly and easily removed from the sharpening device.

From the above description it seems that applicant has provided an extremely simple and efficient machine especially adapted to sharpen the lawn mowers or cutters of similar construction.

The parts of the device are few, simple and when assembled have substantially no tendency to become disarranged or inoperative. There is a great advantage in sharpening the parts of the lawn mower without disassembling the cutter head and cutter bar. The parts being sharpened in assembled position will be much less liable to get out of correct position when again placed in the mower.

It will, of course, be understood that various changes may be made in the form, details and arrangement of the device without departing from the scope of applicant's invention, which, generally stated, consists in the matter shown and described and set forth in the appended claims.

What is claimed is:

1. A device for sharpening lawn mowers having in combination a frame, means thereon for holding and supporting the axle of an assembled cutter head and cutting blade of a lawn mower, and means for turning said means to turn the cutter head against the blade to sharpen the same.

2. A device of the class described having in combination a frame, means thereon to receive and hold the cutter shaft of the cutter head of a lawn mower, means for supporting the cutter bar of said mower, and means for turning said means to turn said shaft and cutter head to sharpen the same.

3. A device to sharpen lawn mowers having in combination, means for receiving and holding the cutter shaft of an assembled cutter head and cutter bar of a lawn mower, a member transversely adjustable relatively to said means for supporting the cutter bar, and means for turning said means to turn said shaft to turn the cutters of a cutter head against the cutting bar to sharpen the same.

4. The structure set forth in claim 3, and means for clamping the cutter bar firmly in position on said adjustable supporting member.

5. A device of the class described comprising a frame member, spaced bearings thereon, adjusting screws mounted in said bearings, a bar mounted on said screws for adjustment, a rotatable sleeve mounted in one of said bearings having its inner end cut on a helix with a longitudinal straight shoulder and having a driving pulley secured to its other end.

6. The structure set forth in claim 5, and an adjustable clamping means secured to said bar.

In testimony whereof I affix my signature in presence of two witnesses.

ARNO C. STIPPICH.

Witnesses:
G. F. WESTCOTT,
R. M. GRIMM.